United States Patent [19]

Lisi

[11] Patent Number: 4,808,041
[45] Date of Patent: Feb. 28, 1989

[54] SUBMERSIBLE MIXER SUPPORT SYSTEM

[75] Inventor: Dominic A. Lisi, Trumbull, Conn.

[73] Assignee: ITT Corporation, New York, N.Y.

[21] Appl. No.: 110,741

[22] Filed: Oct. 20, 1987

[51] Int. Cl.[4] .............................................. C02F 3/02
[52] U.S. Cl. .................................. 405/303; 405/210;
 405/36; 210/219; 210/926; 366/343; 366/286;
 366/279
[58] Field of Search ................ 405/90, 106, 204, 224,
 405/86, 87, 103, 104, 210; 210/926, 629, 219;
 366/342, 343, 349, 279, 286; 248/276; 403/4

[56] References Cited

U.S. PATENT DOCUMENTS

| | | | |
|---|---|---|---|
| 660,185 | 10/1900 | Franklin | 366/286 X |
| 1,867,824 | 7/1932 | Hammerly | 366/279 X |
| 2,658,736 | 11/1953 | Alderfer | 366/279 X |
| 3,171,635 | 2/1965 | Haentjens et al. | 366/286 |
| 3,290,888 | 12/1966 | Palmer et al. | 405/105 |
| 3,401,527 | 9/1968 | Palmer et al. | 405/106 X |
| 3,760,946 | 9/1973 | Boler | 210/219 X |
| 4,464,259 | 8/1984 | Cramer et al. | 366/286 X |
| 4,511,257 | 4/1985 | Roberts | 366/286 X |
| 4,582,451 | 4/1986 | Hollander | 405/105 |

Primary Examiner—Dennis L. Taylor
Attorney, Agent, or Firm—M. J. Lombardi

[57] ABSTRACT

A submersible mixer support system for use in sewage treatment systems and the like has parallel tubular guide bars supporting at least one mixer stand unit having a slow rotation, large propellered mixer thereon. The mixer stand unit is releasably clamped to the parallel guide bars by clamping units each having a horseshoe-shaped resilient clamping block deformable when a clamping pressure is applied thereto by a preload assembly located remotely therefrom. The mixer support system facilitates removal and servicing of the various subassemblies located thereon.

15 Claims, 3 Drawing Sheets

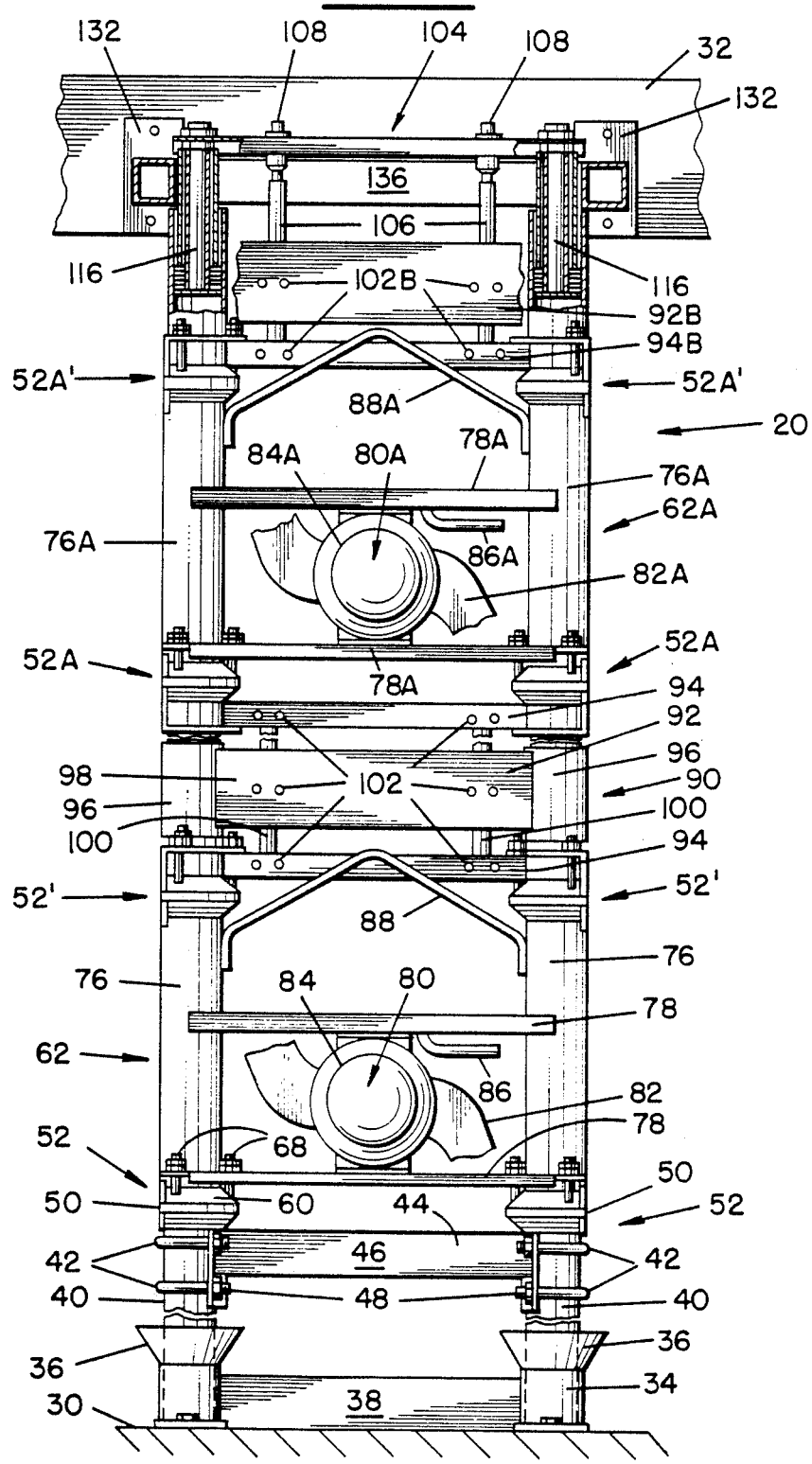

SUBMERSIBLE MIXER SUPPORT SYSTEM

BACKGROUND OF THE INVENTION

1. Field of the Invention

The present invention relates generally to submersible mixer support systems and more particularly to a support system for low speed submersible mixers for use in sewage system treatment facilities and the like.

2. Description of the Prior Art

The use of large propellered slow rotation devices to produce a large flow is known for preventing ice formation, providing fresh water for fish farms, blending low viscosity liquids in process mixing operations, and providing circulation in sewage treatment facilities. Generally, for servicing and inspection purposes, the mixing devices have to have the capability of being removed by service personnel at the surface of the body of liquid being mixed as the liquid is oftentimes inhospitable to divers and the like.

Traditionally, these mixers have been slidably mounted to a mast support system to furnish the desired removability capability. A four inch (4″) square mast is secured to the bottom of the body of liquid and the mixer is fastened to the mast with a sliding bracket allowing the mixer to slide up and down the mast to be positioned at the desired operating location and facilitate removal. Because these mixers operate in harsh environments and the slow rotation of the large propeller blades produce tremendous forces and twisting loads on the mixers and the masts, many problems have arisen with the single mast systems. In particular, the single mast systems have exhibited mast failure, i.e., the brackets which hold the mixers subject the masts to fretting wear thereby initiating unintended and undesirable oscillatory movements of the mixing devices. Such problems create the need for frequent repairs and replacements of the masts and propellered mixer units requiring downtime for the entire mixing systems which, particularly in the case of sewage treatment systems, is undesirable as the systems cannot continue to operate without the mixing devices in place and functioning.

SUMMARY OF THE INVENTION

The present invention is designed to overcome the above noted limitations that are attendant upon the use of the "prior art" devices, and toward this end, it contemplates the provision of a novel mounting system having parallel guide bars with the submersible mixing devices releasably clamped thereto.

It is an object of the present invention to provide a novel mixer mounting system which eliminates the fretting wear associated with single mast mounting systems.

It is also an object to provide such a system in which submersible mixing devices are clamped to the parallel guide bars yet can be easily removed by an operator at the surface of the body of liquid within which the mixers are submersed.

A further object is to provide such a submersible mixer support system which may be readily and economically fabricated and will enjoy a long life in operation.

It has now been found that the foregoing and related objects can be readily obtained in a submersible mixer support system comprising a channel for holding a liquid material having a bottom wall and a pair of side walls, at least two parallel substantially vertical guide bars supported at their lower ends on the bottom wall of the channel and extending upwardly therefrom, a submersible mixer device mounted on a mixer stand, the mixer stand extending between the parallel guide bars, and a mechanism permitting selective clamping of the mixer stand to the parallel guide bars from a position remote from the mixer stand whereby the selective clamping mechanism allows the mixer stand to be clamped to the guide bars and unclamped from the guide bars to permit relative movement therebetween.

Desirably, the clamping mechanism includes a resilient component for selectively connecting the mixer stand to the parallel guide bars and a device for selectively deforming the resilient connecting component to clamp the mixer stand to the parallel guide bars. The resilient connecting component comprises at least one resilient horseshoe-shaped clamping block and the device for selectively deforming the resilient connecting component includes at least one pair of clamping members dimensionally sized to provide its associated clamping block with a clamping force to deform the same and clamp the mixer stand to the guide bars. The clamping members are opposed cup-shaped clamping members whereby the clamping block fits snugly within and is substantially confined by the opposed clamping members so the clamping force provided by the clamping members squeezes the clamping block into clamping engagement with the guide bars. The device for selectively deforming the resilient connecting component is a removable preload cartridge for providing a downward force on the mixer stand to deform the resilient connecting component.

In the preferred embodiment of the invention, the clamping mechanism comprises two sets of clamping units located adjacent the guide bars, one set located at a bottom of the mixer stand and the other located at a top of the mixer stand. Each of the clamping units is provided by a resilient clamping block and clamping members dimensionally sized to provide the clamping block with a clamping force to deform the same and clamp the mixer stand to the guide bars.

Conveniently, a walkway extends over the channel and the guide bars are supported at their upper ends by the walkway. The guide bars are secured to the walkway by a support structure and fixing devices extending into an interior portion of the guide bars and being expandable to secure the guide bars to the walkway.

The invention will be fully understood when reference is made to the following detailed description taken in conjunction with the accompanying drawings.

BRIEF DESCRIPTION OF THE DRAWINGS

FIG. 2 is a side elevational view of the submersible mixer support system of the present invention showing the mixers in operating position clamped to the parallel guide bars, portions of this view are broken away and in section for illustrating internal structure;

DESCRIPTION OF THE PREFERRED EMBODIMENT

Figure 1:
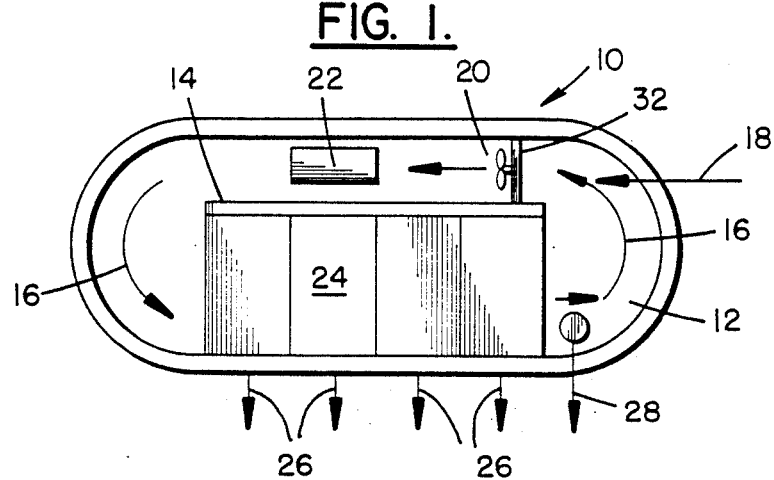
FIG. 1 is a schematic top elevational view of a sewage treatment system incorporating the submersible mixer support system of the present invention.

Turning first to FIG. 1 of the drawings, therein illustrated is a waste water or sewage treatment system in which the submersible mixer support system of the present invention can be used. The illustrated system is designed by the engineering and consulting firm of Burns & McDonald, 4800 East 63rd Street, Kansas City, Mo. and is generally indicated by the numeral 10.

The sewage treatment system 10 is comprised of a raceway channel 12 approximately three hundred feet (300') long, eighty feet (80') in width, and twenty feet (20') in depth. The raceway channel 12 has a dividing wall 14 around which the sewage to be treated travels in a counterclockwise direction indicated by arrows 16. Raw untreated sewage is introduced at one end of the raceway channel 12 as indicated by arrow 18 and moves under the influence of a mixing device generally indicated by numeral 20 in a counterclockwise direction 16 past an aeration unit 22 and through a clarifier 24. The sewage is continuously circulated within the raceway channel 12 and separated as it undergoes treatment by these various devices whereby a clarified effluent can be removed as indicated by arrows 26 and a sludge or waste mixed liquor can be removed as indicted by arrow 28. This particular system is described in a number of recent technical articles: "Pilot Test Prove Innovative, Cost-Saving Wastewater Treatment System", Journal: Water Pollution Control Federation, Volume 56, Number 1, January 1984, pages 34–40; "New Wastewater Process Cuts Plant Costs 60%", Civil Engineering, Volume 53, Number 5, May 1983; "Missouri Treatment Plant Wins Recognition", EPA Journal, Volume 8, Number 2, March-April 1982, page 27; "New Treatment Combines Aeration and Clarification in One Basin", Food Processing, September 1983; "Simplified Clarifier Axes Treatment Stages", World Water, May 1982, pages 22-24; and "New Clarification Device May Revolutionize the Wastewater Treatment Industry", Water and Pollution Control, Directory & Buyers, Guide, 1983.

Figure 3:
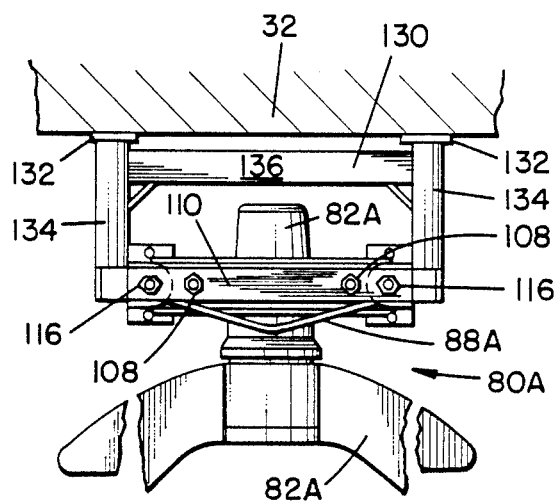
FIG. 3 is a top elevational view of the submersible mixer support system of FIG. 2.

The mixing system used in the treatment system 10 has been a single mast type mixing system as previously described; however, the present dual guide bar submersible mixer support system is designed to replace the previously used single mast system. Referring now to FIGS. 2 and 3, the setup for the dual guide bar submersible mixer support system of the present invention can be more clearly understood. The submersible mixer support system generally indicated by numberal 20 extends upwardly from the bottom wall 30 Of the raceway channel 12 with its upper end mounted to a walkway 32 from which an operator can lift and manipulate the various mixing subassemblies of the system 20 as will be explained further hereinafter. Securely fixed to the bottom wall 30 of the raceway channel 12 is bottom guide bar support 34 having a pair of spaced apart cone-shaped socket guides 36 with a central connecting bar 38 therebetween. Seated within each of the cone-shaped guides 36 and extending upwardly therefrom is a tubular guide bar 40 sealed at its lower end and open at its upper end. The tubular guide bars 40 are approximately twenty feet (20') in length and are positioned by the cone-shaped guides 36 to be parallel in orientation.

Spaced approximately three feet (3') upwardly from the bottom wall 30 of the raceway channel 12 and securely mounted by four U-shaped bolts 42 to the tubular guide bars 40 is a bottom mixer support 44. The bottom mixer support 44 has a central support beam 46 with two half-round support brackets 48 on either end thereof to which the U-shaped bolts 42 are attached to secure the bottom mixer support 44 to the tubular guide bars 40.

Figure 4:
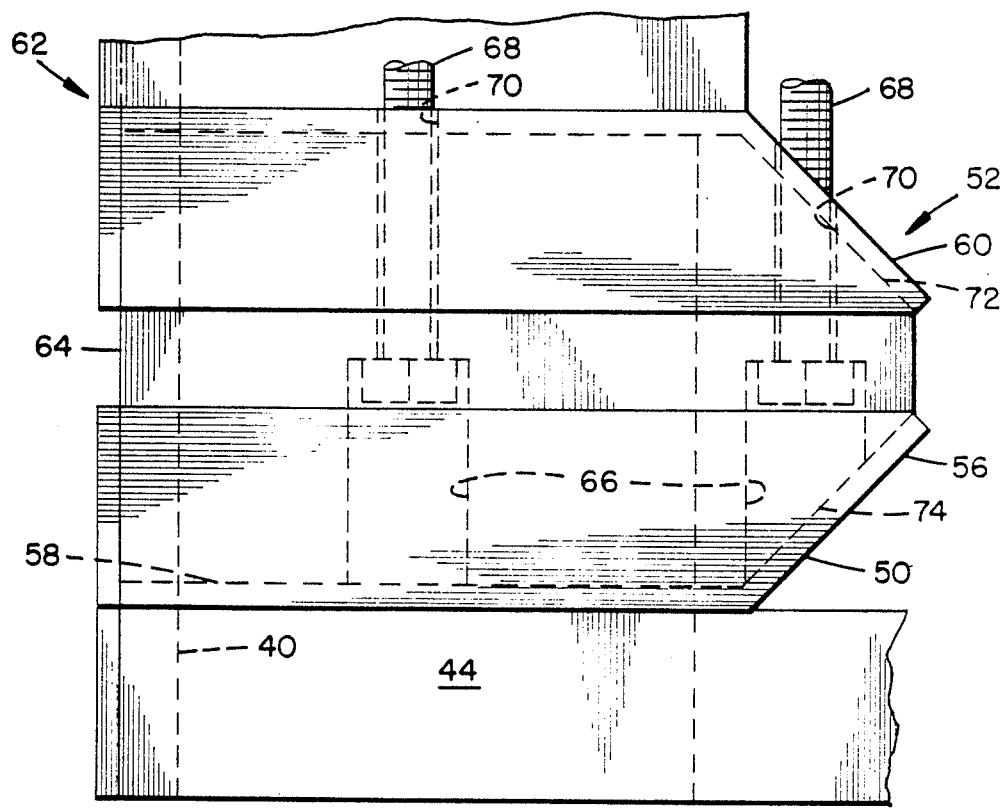
FIG. 4 is a fragmentary side elevational view of one of the clamping devices for securing various components of the submersible mixer support system to the parallel guide bars with some of the internal structure shown in dotted line for purposes of illustration.

Secured to the upper side of the bottom mixer support 44 adjacent the guide bars 40 are lower cup-shaped or truncated cone-shaped clamping members 50 of spaced apart resilient clamping units generally indicated by the numeral 52. As best seen in FIG. 4, each of the lower cup-shaped or truncated cone-shaped clamping member 50 has an angular semi-circular shaped side wall 56. An upper cup-shaped or truncated cone-shaped clamping member 60 is attached to a first mixer stand 62 and has a similar configuration to the lower clamping member 50 but is downwardly orientated instead of upwardly orientated so that the clamping members 50 and 60 are oppositely disposed to one another.

Figure 5:
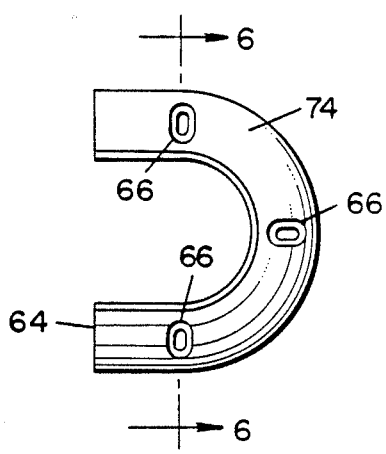
FIG. 5 is a top elevational view of one of the horseshoe-shaped nitrile rubber clamping blocks of the present invention.
Figure 6:
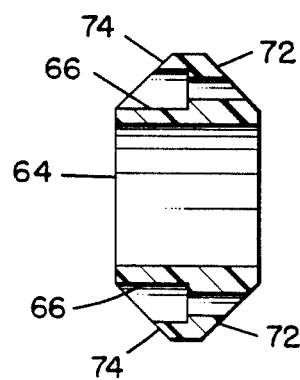
FIG. 6 is a cross-sectional view of the horseshoe-shaped nitrile rubber clamping block taken along the 6—6 line of FIG. 5.

Mounted to the upper clamping member 60 and releasably seated within the lower clamping member 50 so as to be sandwiched between them is a horseshoe-shaped nitrile rubber clamping block 64. As seen in FIGS. 5 and 6, the clamping block is provided with its horseshoe shape and has three (3) spaced apart mounting apertures 66 through which three hex-headed bolts 68 (two shown in FIG. 4) pass to secure the clamping block 64 to the first mixer stand unit 62 and the upper clamping member 60. It should be appreciated that the apertures 66 have lesser and greater diameters creating abutment surfaces for the heads of the bolts 68 and the upper clamping block has aligned holes 70 permitting the bolts to pass therethrough. The clamping block 64 has tapered upper and lower walls 72 and 74 whose incline is equal to the incline of the angular semi-circular side walls 56 of the upper and lower clamping members (60,50) so that the clamping block 64 fits snugly within the upper and lower clamping members 60, 50 to clamp the mixer stand unit 64 to the guide bar 40 that passes therethrough as shown in FIG. 4 and as will be explained further hereinafter.

The first mixer stand unit 62 comprises a pair of U-shaped slide members 76 having their open ends extending outwardly from each other and being positioned around the guide bars 40. Mounted on the U-shaped slide members 76 is a pair of spaced apart parallel horizontal channel members 78 upon which is mounted a mixer generally indicated by the number 80. The mixer 80 includes a propeller 82 and an electric motor 84 and is preferably manufactured by Flygt Corporation, Norwalk, Conn., Model No. 4410 or 4430. These mixers have a propeller speed of approximately 17 to 54 rpm and a propeller diameter of approximately four to eight feet (4'-8'). Electric power is supplied to the motor 84 through an electrical line 86. Attached to the inner side of U-shaped slide members 76 upwardly from the parallel horizontal channel members 78 is a lifting bail 88 adapted to be engaged by a winch (not shown) on the walkway 32 for lifting the mixer stand unit 62 from the raceway channel 12.

Another set of clamping units 52' is located at the upper end of the first mixer stand unit 62. These clamping units 52' are of identical construction as the first set of clamping units 52 at the bottom of the first mixer stand unit 62; however, they serve to clamp a spacer assembly, generally indicated by the numeral 90, to the guide bars 40. The spacer assembly 90 is located above the first mixer stand unit 62 and functions to space the first mixer stand unit 62 from a second mixer stand unit generally indicated by numeral 62A mounted thereabove to provide clearance between the propeller blades 82 and 82A. The spacer assembly 90 comprises a spacer block 92 centrally located between two spacer channel members 94. The spacer block 92 is provided by two U-shaped slide members 96 (similar to the U-shaped slide members 76 of the mixer stand unit 62) with a spacer bar 98 therebetween. The spacer block supports 94 have a pair of spacer pipes 100 extending therebetween providing the desired amount of spacing as governed by the size of the propeller blades being employed. Six securing devices 102 serve to retain the spacer pipes 100 to the spacer block 92 and spacer channel members 94 thereby holding the spacer assembly 90 in assembled condition.

Mounted on the guide bars 40 above the spacer assembly 90 is the second mixer stand unit 62A identical to the first mixer stand unit 62 with like parts identified with like numerals with the addition of the letter A for the parts from the second mixer stand unit 62A. The second mixer stand unit 62A is releasably secured to the guide bars 40 by clamping units 52A.

Figure 7:
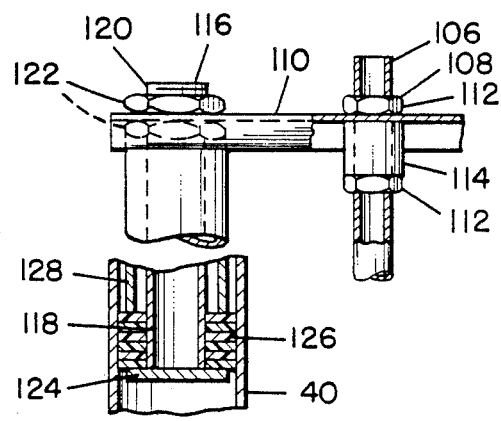
FIG. 7 is a fragmentary side elevational view of one of the parallel guide bar securing devices and preload cartridges with portions, broken away for purposes of illustration.

Releasably secured on the guide bars 40 above the second mixer stand unit 62A by clamping units 52A' is a preload assembly generally indicated by the numeral 104 for providing downward clamping pressure on the clamping units 52, 52', 52A and 52A'. The preload assembly 104 includes a spacer block 92B and spacer channel member 94B similar to the spacer block 92 and spacer channel members 94 previously described with respect to the spacer assembly 90. Extending upwardly from the spacer channel member 94B secured thereto by securing devices 102B are preload pipes 106 having preload cartridges 108 at the upper ends thereof. Referring to FIG. 7, it can be seen that the preload cartridges 108 have reduced diameter portions 107 inserted into upper open ends of pipes 106 and threaded portions 109 at their upper ends passing through a channel member 110 to which they are releasably locked by nuts 112 and 113 and enlarged washer 114.

Portions of the spacer block 92A and the guide bars 40 have been broken away in FIG. 2 to reveal mounting elements 116 for securing the upper ends of the guide bars 40 and positioning them parallel to one another. As best seen in FIG. 7, each mounting device 116 includes a fixing pipe 118 having (1) an upper threaded end 120 for receiving nuts 122 and 123 for locking the device 116 to channel member 110 and (2) a lower capped end 124. The lower capped end 124 abuts a plurality of expandable grommets 126 which in turn abut a second outer pipe 128. To load the expandable grommets 126 and thus secure the mounting device 116 to its associated guide bar 40 through expansion of the grommets 126, the lower nuts 122 are turned on threaded end 120 to apply a force to the expandable grommets 126 as they are squeezed by the lower end of the outer pipe 128 and the cap of the fixing pipe 118. Upper nuts 123 are used to secure the preload assembly 104 in place by engaging channel member 110.

As can be seen in greater detail in FIG. 3, the channel member 110 is mounted to the walkway 32 by a superstructure 130 having support brackets 132, cantilevered support arms 134 and support beam 136.

Figure 8:
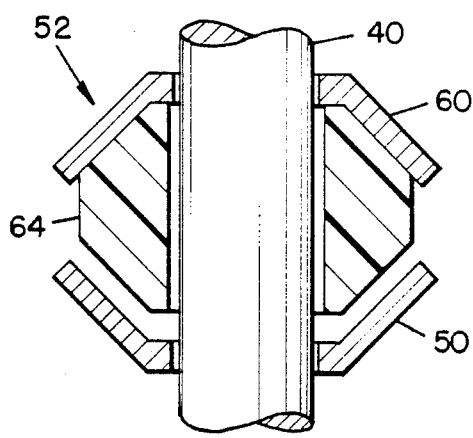
FIGS. 8 and 9 are schematic cross-sectional illustrations of one of the clamping devices of the present invention in its unclamped and clamped positions, respectively.
Figure 9:
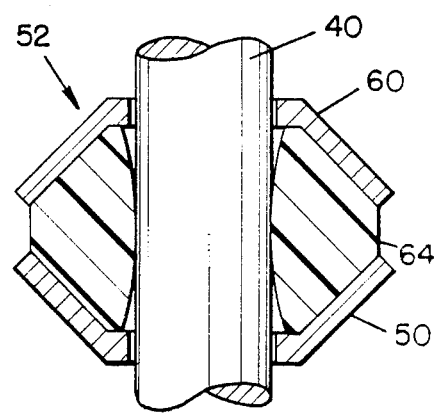

Turning now to FIGS. 8 and 9, one of the clamping units (in this case, unit 52) is shown in its unclamped and clamped positions, respectively. It should be understood that all of the clamping units 52, 52', 52A, and 52A' are of identical structure. These clamping units 52, 52', 52A and 52A' permit the various subassemblies 62, 90, 62A and 104 of the mixer support structure 20 to be clamped to and removed from the guide bars 40 in the following manner. By appropriate manipulation of the nuts 112 of the preloading cartridges 106 on channel member 110, a downward force can be applied on the clamping units 52, 52', 52A and 52A' so that the clamping block 64 for each unit is deformed into clamping engagement with the guide bar 40 as illustrated in FIG. 9. This clamping engagement virtually eliminates oscillatory movement of the various subassemblies traditionally encountered due to slow rotation of the propeller blades.

To unclamp the subassemblies 62, 90, 62A and 104 and remove them from the guide bars 40, the preload assembly 104 is disassembled and removed by an operator from walkway 32. This procedure removes the downward force on the clamping devices 52, 52', 52A and 52A' and restores the eight horseshoe-shaped nitrile rubber clamping blocks to their relaxed, unclamped condition. Thereinafter, the mixer units 62 and 62A and spacer assembly 90 and the remainder of preload assembly 104 can be pulled upwardly using bales 88 and 88A via a winch (not shown) manually operated by the operator from the walkway 32. The clamp unit 52 is shown being disassembled in FIG. 8 with the clamping block 64 and clamping member 60 being drawn upwardly along guide bar 40 away from lower clamping member 50.

Thus, it can be seen from the foregoing specification and attached drawings that the submersible mixer support system of the present invention provides an effective means for securely clamping the mixer stand units to the parallel guide bars to prevent oscillation of the mixer stand units relative to the guide bars and, therefore, decreases dramatically the amount of fretting wear on the guide bars as compared with the prior single mast systems. Yet, the devices are completely removable via a winch manipulated by a user from a remote location on the walkway. Accordingly, it is not necessary to send service personnel into the unhealthy environment of the liquid material being mixed or empty the raceway channel when the need arises for servicing or inspection of the various subassemblies.

It will be appreciated by those skilled in the art that the major components of the present submersible mixer support structure, except the horseshoe-shaped nitrile rubber clamping blocks and the expandable grommets, are made from a stainless steel material to resist the corrosive effect of the liquids in which these components are used.

The preferred embodiment described above admirably achieves the objects of the invention; however, it will be appreciated that the departures can be made by those skilled in the art without departing from the spirit and scope of the invention which is limited only by the following claims.

What is claimed is:

1. In a channel for holding liquid material having a bottom wall and a pair of side walls a, submersible mixer support system comprising:
   at least two parallel substantially vertical guide bars supported at their lower ends on the bottom wall of the channel and extending upwardly therefrom;
   a submersible mixer device mounted on a mixer stand extending between said parallel guide bars;
   means located at the top and bottom of said mixer stand permitting selective clamping of said mixer stand to said parallel guide bars from a position remote from said mixer stand, whereby said selective clamping means allows said mixer stand to be clamped to said guide bars and unclamped from said guide bars to permit relative movement between said mixer stand and said guide bars for removal of said stand and said device;
   said clamping means includes resilient means for selectively connecting said mixer stand to said parallel guide bars and means for selectively deforming said resilient connecting means to clamp said mixer stand to said parallel guide bars, and said resilient connecting means comprises at least one resilient clamping block shaped to engage one of said guide bars and said means for selectively deforming said resilient connecting means includes clamping members dimensionally sized to provide said clamping block with a clamping force to deform the same and clamp said mixer stand to one of said guide bars; and
   said clamping block has tapered sidewalls and said clamping members are opposed cup-shaped clamping members whereby said clamping block fits snugly within and is substantially confined by said opposed clamping members so said clamping force provided by said clamping members squeezes said clamping block into clamping engagement with one of said guide bars.

2. The submersible mixer support system in accordance with claim 1, wherein said means for selectively deforming said resilient connecting means is a preload device having means providing a downward force on said mixer stand to deform said resilient connecting means.

3. The submersible mixer support system in accordance with claim 1, wherein said clamping means comprises two sets of clamping units located adjacent said guide bars, one set located at a bottom of said mixer stand and the other set located at a top of said mixer stand.

4. The submersible mixer support system in accordance with claim 3, wherein each of said clamping units is provided by a resilient clamping block and clamping members dimensionally sized to provide said clamping block with a clamping force to deform the same and clamp said mixer stand to said guide bars.

5. A submersible mixer support system comprising:
   channel means for holding a liquid material having a bottom wall and a pair of side walls;
   at least two parallel substantially verticle guide bars supported at their lower ends on said bottom wall of said channel means and extending upwardly therefrom;
   submersible mixer device mounted on a mixer stand, said mixer stand extending between said parallel guide bars;
   means positioned at the top and bottom of said mixer stand for selective clamping of said mixer stand to said parallel guide bars from a position remote from said mixer stand, whereby said selective clamping means allows said mixer stand to e clamped to said guide bars and unclamped from said guide bars to permit relative movement between said mixer stand and said guide bars;
   said clamping means includes resilient means for selectively connecting said mixer stand to said parallel guide bars and means for selectively deforming said resilient connecting means to clamp said mixer stand to said parallel guide bars, and said resilient connecting means comprises at least one resilient clamping block shaped to engage one of said guide bars and said means for selectively deforming said resilient connecting means includes clamping members dimensionally sized to provide said clamping block with a clamping force to deform the same and clamp said mixer stand to one of said guide bars; and said clamping members are opposed cup-shaped clamping members whereby said clamping block fits snugly within and is substantially confined by said opposed clamping members so said clamping force provided by said clamping members squeezes said clamping block into clamping engagement with one of said guide bars.

6. The submersible mixer support system in accordance with claim 5, wherein said means for selectively deforming said resilient connecting means is a preload device having means providing a downward force on said mixer stand to deform said resilient connecting means.

7. The submersible mixer support system in accordance claim 5, wherein said clamping means comprises two sets of clamping units located adjacent said guide bars, one set located at a bottom of said mixer stand and the other located at a top of said mixer stand.

8. The submersible mixer support system in accordance with claim 7, wherein each of said clamping units is provided by a resilient clamping block and clamping members dimensionally sized to provide said clamping block with a clamping force to deform the same and clamp said mixer stand to said guide bars.

9. The submersible mixer support system in accordance with claim 5, further including a walkway extending over said channel means, said guide bars being supported at their upper ends by said walkway.

10. The submersible mixer support system in accordance with claim 9 further including means for securing said guide bars to said walkway, said securing means have a support structure and fixing devices extending into an interior portion of said guide bars and being expandable to secure said guide bars to said walkway.

11. Apparatus support system for use in a channel having a bottom wall and a pair of side walls comprising:
    at least two parallel guide bars supported at their lower ends on the bottom wall of the channel and extending upwardly therefrom;
    an apparatus for mixing mounted on a stand, said stand extending between said parallel guide bars;
    selective clamping means being located at the top and bottom of said stand and permitting selective clamping of said stand to said two parallel guide bars from a position remote from said stand, whereby said selective clamping means allows said stand to be clamped to said guide bars and unclamped from said guide bars to permit relative movement between said stand and said guide bars for removal of said stand and said apparatus;

said clamping means includes resilient means for selectively connecting said stand to said parallel guide bars and means for selectively deforming said resilient connecting means to clamp said stand to said parallel guide bars, and said resilient connecting means comprises at least one resilient clamping block shaped to engage one of said guide bars and said means for selectively deforming said resilient connecting means includes clamping members dimensionally sized to provide said clamping block with a clamping force to deform the same and clamp said stand to one of said guide bars; and said clamping block has tapered sidewalls and said clamping members are opposed cup-shaped clamping members whereby said clamping block fits snugly within and is substantially confined by said opposed clamping members so said clamping force provided by said clamping members squeezes said clamping block into clamping engagement with one of said guide bars.

12. The apparatus support system in accordance with claim amended 11, wherein said means for selectively deforming said resilient connecting means is a preload device having means providing a downward force on said stand to deform said resilient connecting means.

13. The apparatus support system in accordance with claim 11, wherein said clamping means comprises two sets of clamping units located adjacent said guide bars, one set located at a bottom of said stand.

14. The apparatus support system in accordance with claim 13, wherein each of said clamping units is provided by a resilient clamping block and clamping members dimensionally sized to provide said clamping block with a clamping force to deform the same and clamp said stand to said guide bars.

15. The apparatus support system in accordance with claim 12, wherein said preload device in an insertable preload cartridge.

* * * * *